United States Patent
Sansone et al.

(10) Patent No.: US 6,187,231 B1
(45) Date of Patent: Feb. 13, 2001

(54) PROCESS FOR PRODUCING POLYMERIC FILMS FOR USE AS FUEL CELLS

(75) Inventors: Michael J. Sansone, Berkeley Heights; Frank J. Onorato, Phillipsburg; Stuart M. French, Chatham; Faruq Marikar, Scotch Plains, all of NJ (US)

(73) Assignee: Celanese Ventures GmbH, Frankfurt am Main (DE)

( * ) Notice: Under 35 U.S.C. 154(b), the term of this patent shall be extended for 0 days.

(21) Appl. No.: 09/269,082

(22) PCT Filed: Sep. 29, 1997

(86) PCT No.: PCT/US97/17790
§ 371 Date: Mar. 18, 1999
§ 102(e) Date: Mar. 18, 1999

(87) PCT Pub. No.: WO98/14505
PCT Pub. Date: Apr. 9, 1998

Related U.S. Application Data

(60) Provisional application No. 60/027,169, filed on Oct. 1, 1996.

(51) Int. Cl.$^7$ ................................... B29C 67/20
(52) U.S. Cl. .............................................. 264/41
(58) Field of Search ............................... 64/41; 204/296; 429/30, 33

(56) References Cited

U.S. PATENT DOCUMENTS

| 4,020,142 | * | 4/1977 | Davis et al. ............... 264/41 X |
| 4,664,761 | | 5/1987 | Zupancic et al. . |
| 4,693,824 | | 9/1987 | Sansone et al. . |
| 4,927,909 | * | 5/1990 | Wadhwa et al. ............ 264/41 X |
| 5,091,087 | | 2/1992 | Calundann et al. . |
| 5,599,639 | | 2/1997 | Sansone et al. . |

FOREIGN PATENT DOCUMENTS

WO 96 13872  5/1996 (WO) .

* cited by examiner

Primary Examiner—Leo B. Tentoni
(74) Attorney, Agent, or Firm—Howson and Howson

(57) ABSTRACT

A method for producing polymeric, e.g., polybenzimidazole (PBI) films, is provided by forming a porous membrane by coagulating a polymeric dope solution in a liquid coagulation bath containing a non-solvent alone or a mixture of a non-solvent and solvent; submerging the resulting membrane into a non-solvent bath to remove any residual solvent; placing the membrane into an acid solution, whereby the pores become filled with the acid solution; and drying the membrane to remove residual non-solvent which collapses the porous structure entrapping the acid and forming a dense film. An alternative method involves coagulating said polymer solution directly into an acid/solvent/non-solvent mixture to produce a porous membrane which imbibes the acid solution, followed by drying.

22 Claims, No Drawings

PROCESS FOR PRODUCING POLYMERIC FILMS FOR USE AS FUEL CELLS

CROSS-REFERENCE TO RELATED APPLICATIONS

This is a 371 of PCT/US97/017790, which claims the benefit of the priority of U.S. patent application Ser. No. 60/027,169, filed Oct. 1, 1996.

FIELD OF THE INVENTION

This invention relates to the manufacture of films for use as polymer electrolytes in fuel cell applications.

BACKGROUND OF THE INVENTION

Fuel cells can be configured in numerous ways with a variety of electrolytes, fuels and operating temperatures. For example, fuels such as hydrogen or methanol can be provided directly to the fuel cell electrode. Alternatively, fuels, such as methane or methanol, can be converted to a hydrogen rich gas mixture external to the cell itself and subsequently provided to the fuel cell. Air is the source of oxygen in most fuel cells, although in some applications, the oxygen is obtained by hydrogen peroxide decomposition or from a cryogenic storage system.

Although there are theoretically a limitless number of combinations of electrolyte, fuel, oxidant, temperatures and so on, practical systems include solid polymer electrolyte systems using hydrogen or hydrazine as the fuel source and pure oxygen as the oxidant. A polybenzimidzole (PBI) which has been doped with a strong acid is an example of a suitable solid polymer for use in an electrolyte system.

See, e.g., U.S. Pat. No. 5,091,087 which discloses a process for preparing a microporous PBI membrane having a uniform pore structure by immersing fine PBI particles in a polymeric solution of a high temperature stable matrix polymer to coat the PBI with the matrix polymer, drying the coated PBI particle, and compression molding the particles to sinter the PBI. The matrix polymer is extracted from the molded PBI.

It is known in the art to imbibe polybenzimidazole (PBI) dense films with a strong acid to make a proton conducting media.

Recently, International Patent Application No. WO96/13872, published May 9, 1996, disclosed a method of doping a PBI with a strong acid, such as phosphoric acid or sulfuric acid, such that a single phase system is formed, i.e., acid is dissolved in the polymer.

Even in view of the advances in the art, the performance, high cost and processability of suitable polymeric electrolyte materials remain important considerations in fuel cell construction with respect to polymeric media for fuel cells.

SUMMARY OF THE INVENTION

In one aspect, the present invention provides an improved method of preparing polymeric films and membranes, particularly those made of a PBI, for use as electrolytes in fuel cells. In one embodiment, the method comprises forming a porous structure by coagulating a PBI dope solution in a coagulation bath containing a non-solvent alone or a mixture of a non-solvent and a solvent, both miscible in each other. The resulting membrane is then submerged into a water bath to remove any residual solvent, and then placed into an acid and water solution. The pores are then filled with the acid/water mixture. The membrane is dried to remove residual water which collapse the porous structure entrapping the acid.

In another aspect, the method comprises coagulating the polymer/solvent mixture directly in an acid/solvent/water mixture to produce the membrane directly and imbibe the acid/water solution. The membrane is then dried to remove residual water and solvent and collapse the pores to produce a dense film. The amount of acid in the resulting film can be controlled by adjusting the membrane porosity, which is determined by the solvent content in the coagulation medium, and controlling the acid concentration in the coagulation bath. Since PBIs are basic polymers, these compounds have an affinity for acids and retain them under extreme conditions. This method is advantageous due to the speed of imbibition and the resulting morphology of the film produced.

In another aspect, the present invention provides improved porous polymeric films prepared by the novel methods described herein. Such films are characterized by higher acid loadings and improved electrochemical and/or mechanical properties. For example, the films may be characterized by better retention of the acid than the films of the prior art.

Other aspects and advantages of the present invention are described further in the following detailed description of the preferred embodiments thereof.

DETAILED DESCRIPTION OF THE INVENTION

The present invention provides an improvement over the art in methods of preparing a microporous polymeric film or membrane for use as an electrolyte in fuel cells. Generally, according to this process, polymeric films, preferably those made from a polybenzimidazole (PBI), are prepared in a controlled fashion with single or multiple component liquids. In one embodiment, one of these liquids, the coagulation bath, comprises a non-solvent. In another embodiment, one of these liquids, the coagulation bath, comprises a miscible mixture of a non-solvent and a solvent. In still a further embodiment, one of these liquids, the coagulation bath, comprises a miscible mixture of a non-solvent, a solvent and an acid.

According to the methods of this invention, a porous structure is formed by coagulating polymer dope solutions in a coagulation bath containing either a non-solvent alone, or a miscible mixture of a solvent and a non-solvent. The addition of a solvent to the mixture slows down the coagulation reaction and can change the morphology of the resulting membrane. The resulting membrane is then submerged into a bath containing the non-solvent to remove any residual solvent, and then placed into a solution containing an acid and a non-solvent, such as an acid/water solution or an acid/methanol solution, among other non-solvents, to fill the membrane pores with the acid solution. The membrane is oven dried to remove residual non-solvent which collapses the porous structure, entrapping the acid.

An advantage of this method is that the acid imbibition occurs over a short timespan, i.e., about 30 seconds to about 1 hour, in contrast to prior art methods which take between 10 to 72 hours. This advantage is reflected in both reduced cost and better performance of the electrolyte.

In any of the embodiments of the method which are described in the examples and in more detail below, the term "polymer dope solution" means a solution containing about 2 to about 30% of a selected polymer dissolved in a suitable solvent. Suitable solvents in which the polymers are dissolved include, without limitation, DMAC, NMP, DMF, DMSO, strong acids such as sulfuric acid, methanesulfonic acid, and trifluoroacetic acid.

The selected polymers employed to form the dopes include polymers containing basic groups that can form complexes with stable acids, or polymers containing acidic groups which can be used to form films suitable for use as a solid polymer electrolyte membrane in fuel cells. These polymers may contain a variety of functional groups. Examples of such polymers include, but are not limited to, polybenzimidazoles (PBI), poly(pyridines), poly (pyrimidines), polyimidazoles, polybenzthiazoles, polybenzoxazoles, polyoxadiazoles, polyquinoxalines, polythiadiazoles, and poly(tetrazapyrenes). The presently preferred, and exemplified polymers are PBIs.

The polybenzimidazole polymer has the known structure, wherein R and $R^1$ are selected from among a variety of linking or functional groups [See, e.g., U.S. Pat. Nos. 4,814,399 and 5,525,436; and International Patent Application No. WO96/13872]:

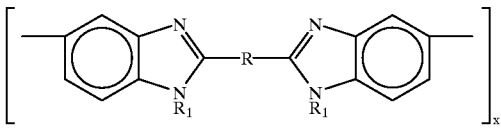

More specifically, in a desired embodiment of this method of producing a polymeric microporous film, polymer dope solution is coagulated in a coagulation bath comprising a non-solvent alone. Among such non-solvents are included, without limitation, water, methanol, acetone, other alcohols and other water miscible non-solvents. The amount of non-solvent(s) in the bath is about 100% by weight of the composition. The bath temperature is generally room temperature but can be anywhere between the freezing point and boiling point of the non-solvent.

The polymeric dope is coagulated in the non-solvent bath until it coagulates into a porous membrane, characterized by a porous structure. The coagulation time, i.e., the amount of time taken for the polymer dope to coagulate, is generally between about 5 seconds to 1 hour.

In still another desired embodiment of this method of producing a polymeric microporous film, polymer dope solution is coagulated in a coagulation bath comprising a mixture of a solvent and a non-solvent. Suitable solvents include, without limitation, DMAC, NMP, DMF, DMSO, strong acids such as sulfuric acid, methanesulfonic acid, trifluoroacetic acid and triflic. From among the solvents and non-solvents identified above, the following combinations are preferred: DMAC/methanol, NMP/methanol, DMAC/water. However, any combination of solvents and non-solvents which are miscible in each other will work in the method of this invention.

Generally, in this embodiment of the method of this invention, the amount of solvent and non-solvent in the bath is between about 0% and about 90% by weight of the solvent, and between about 100% and about 10% by weight of the non-solvent. The bath temperature is generally room temperature, but can be anywhere between the freezing point and boiling point of the non-solvent/solvent mixture. The polymeric dope is precipitated in the coagulation bath for about 5 seconds to about 1 hour until it coagulates into a porous membrane, characterized by a porous structure.

The amount of solvent or non-solvent in the coagulation bath controls the kinetics of the reaction, and thereby controls the morphology of the resulting film. The greater the amount of solvent in the bath, the slower the coagulation occurs. For example, at a DMAC content of 50% by weight, a PBI dope solution coagulates at about 3 minutes.

After soaking in one of the above-discussed coagulation baths, the resulting membrane is submerged into a non-solvent bath, such as a water or methanol, or a bath formed of a mixture of non-solvents to remove any residual solvent for about 0.5 to about 60 minutes, usually less than about 5 minutes. The bath temperature is generally room temperature but can be anywhere between the freezing point and boiling point of the non-solvent.

The membrane is then soaked in an acid solution consisting of acid and a non-solvent, for example a solution of acid and water, or acid and methanol, among others. The acid solution generally contains about 5 to about 100 weight percent, preferably about 50 weight percent, of an acid, such as phosphoric, sulfuric, methanesulfonic acids, among others. Generally the acid solution is at room temperature, with elevated temperatures increasing the rate of imbibition. This soaking step generally takes about 1 minute to about 2 hours. The preferred time depends on temperature and acid concentration. For example, at room temperature and 50 weight % acid, the soaking step takes less than about 5 minutes, in which time the pores in the coagulated membrane become filled with the acid solution.

The membrane is then dried at room temperature to about 200° C., preferably between about 80° C. to about 180° C., to remove residual solvent and non-solvent, such as DMAC, water, and/or methanol. This drying step collapses the porous structure, thereby entrapping the acid and forming a dense film. The resulting membrane or film is capable of imbibing up to about 80% of the acid in the acid solution.

In an alternative embodiment of the method of this invention, the polymer dope is precipitated directly in a coagulation bath consisting of a mixture of a non-solvent and an acid, or a non-solvent, a solvent and an acid, the components of the bath being miscible in each other. This allows the production of the acid imbibed membrane in a single step, i.e., without a separate soaking step. The individual components of the coagulation bath are selected from the lists of solvents, non-solvents and acids described above.

The coagulation bath containing an acid and a non-solvent generally comprises about 5 to about 75% by weight of a suitable strong acid, selected from among those acids discussed above, in admixture with between about 95 to about 25% by weight non-solvent. The coagulation bath containing an acid, a solvent and a non-solvent generally comprises between about 5 to about 75% by weight of a suitable strong acid, between about 95 to about 10% by weight non-solvent, and between 0 to about 85% by weight solvent. These mixtures are usually at room temperature, but can be up to 80° C. The polymer from the coagulation bath is placed in this mixture for between about 1 and about 60 minutes. In this bath the pores of the coagulated membrane become filled with the acid solution.

The membrane is then dried at room temperature to about 200° C., preferably between about 80° C. to about 180° C. for about 5 minutes to about 24 hours depending on drying conditions. The drying removes residual solvent and non-solvent, such as DMAC, water, and/or methanol, and collapses the pores to entrain the acid and produce a dense film.

In any embodiment of the method of this invention, the amount of acid in the resulting film can be controlled by adjusting the membrane porosity, temperature, soak time, and acid concentration as well as the specific materials employed. By controlling the acid concentration in the acid bath and the residence time, one controls the amount of acid in the resulting film. Since PBI is a basic polymer, it has an affinity for acids and will retain then under extreme conditions.

According to these methods, dense films or asymmetric membranes may be prepared in a controlled fashion, more rapidly than the prior art. These methods lead to better functional and mechanical properties of the film. Among such functional properties is a more tenacious acid retention, better electrochemical properties, and possibly other enhanced properties desirable for fuel cell use. The polymeric membranes resulting from the practice of these methods will generally contain from about 40% to about 80% acid by weight of the membrane itself. For a polymer to function adequately as an electrolyte in a fuel cell, about 50% or more acid is required.

The following examples illustrate the preferred compositions and methods of the invention, using a PBI as the exemplified polymer. These examples are illustrative only and do not limit the scope of the invention.

EXAMPLE 1

PBI Cast Films with Non-solvent Coagulation Bath

PBI plate glass cast films (20 mil thickness wet cast) using an adjustable casting knife are prepared as follows. The polymeric dope solution (Sample 23-1) is prepared by mixing 10 g PBI (10% solids) [poly 2,2'-(metaphenylene)-5,5'-bibenzimidazole, Hoechst Celanese Corporation] and 90 g DMAC [DuPont]. This dope solution is then placed in a 100% by weight water coagulation bath for coagulation of the polymer dope into a membrane. After 3 minutes in the bath, the membrane was removed and rinsed in a water bath for 1 minute at 23° C.

In a second step, the membrane is then soaked in an aqueous acid solution containing 85% phosphoric acid. This soaking occurs at a temperature of 23° C. for about 2 minutes. The membrane is then oven dried at a temperature of 120° C. for 12 hours to remove residual water and solvent, e.g., DMAC. The resulting dense film contains about 52% acid by weight.

EXAMPLE 2

PBI Cast Films with Non-solvent Coagulation Bath

PBI plate glass cast films (20 mil thickness wet cast) using an adjustable casting knife are prepared as follows. The polymeric dope solution (Sample 23-1) is prepared by mixing 10 g PBI (10% solids) [poly 2,2'-(metaphenylene)-5,5'-bibenzimidazole, Hoechst Celanese Corporation] and 90 g DMAC [DuPont]. This solution is then placed in a coagulation bath containing 100% by weight methanol. After 6 minutes in the bath, the membrane was removed and rinsed in a methanol bath for 3 minutes at 23° C.

In the second step, the membrane is then soaked in a methanol/acid solution containing 50% phosphoric acid. This soaking occurs at a temperature of 23° C. for 5 minutes. The membrane is then oven dried at a temperature of 120° C. for 12 hours to remove residual methanol and DMAC. The resulting dense film contains about 58% acid by weight. The resulting membrane has improved acid retention and better mechanical properties.

EXAMPLE 3

PBI Cast Films with a Non-solvent/Solvent Coagulation Bath

PBI plate glass cast films (20 mil thickness wet cast) using an adjustable casting knife are prepared as follows. The polymeric dope solution (Sample 23-1) is prepared by mixing 10 g PBI (10% solids) [poly 2,2'-(metaphenylene)-5,5'-bibenzimidazole, Hoechst Celanese Corporation] and 90 g DMAC [DuPont]. This solution is then placed in a coagulation bath containing both a non-solvent and a solvent, i.e., 50/50 wt % methanol/DMAC. After 4 minutes in the bath, the membrane was removed and rinsed in a methanol bath for 5 minutes at 23° C.

In the second step, the membrane is then soaked in a methanol/acid solution containing 60% phosphoric acid. This soaking occurs at a temperature of 23° C. for 10 minutes. The membrane is then oven dried at a temperature of 140° C. for 14 hours to remove residual methanol and DMAC. The resulting dense film contains about 61% acid by weight. The resulting membrane also has improved acid retention and better mechanical properties.

EXAMPLE 4

PBI Cast Films with Single Step Coagulation/Acid Bath

PBI plate glass cast films (20 mil thickness wet cast) using an adjustable casting knife are prepared as follows. The polymeric dope solution (Sample 23-1) is prepared by mixing 10 g PBI (10% solids) [poly 2,2'-(metaphenylene)-5,5-bibenzimidazole, Hoechst Celanese Corporation] and 90 g DMAC [DuPont]. According to the single step embodiment of the method of this invention, this dope solution is then placed in a single non-solvent/solvent/acid bath for both coagulation and acid imbibition. This bath contains 30/20/50 wt % methanol/DMAC/phosphoric acid bath. After 8 minutes in the bath, the membrane was removed. The membrane is then oven dried at a temperature of 60° C. for 2 hours, 100° C. for 2 hours, and 150° C. for 10 hours to remove residual methanol and DMAC. The resulting dense film contains about 70% acid by weight.

All documents cited above are incorporated by reference. Numerous modifications and variations of the present invention are included in the above-identified specification and are expected to be obvious to one of skill in the art. Such modifications and alterations to the compositions and processes of the present invention are believed to be encompassed in the scope of the claims appended hereto.

What is claimed is:

1. A method for producing a polymeric film suitable for use as an electrolyte comprising the steps of:
   a. forming a porous membrane by coagulating a polymer dope solution, said solution comprising a polymer dissolved in a solvent, in a liquid coagulation bath comprising a non-solvent;
   b. submerging the resulting membrane into a non-solvent bath to remove any residual solvent;
   c. placing said membrane into an acid solution in a non-solvent, whereby the pores become filled with the acid solution;
   d. drying the membrane to remove residual non-solvent, which collapses the porous structure entrapping the acid and forming a dense film.

2. The method according to claim 1 wherein said polymer dope solution comprises a solution containing about 2 to about 30% of a selected polymer dissolved in about 98 to about 70% of a suitable solvent.

3. The method according to claim 2 wherein said selected polymer is selected from the group consisting of a polybenzimidazole (PBI), a poly(pyridine), a poly(pyrimidine), a polyimidazole, a polybenzthiazole, a polybenzoxazole, a polyoxadiazole, a polyquinoxaline, a polythiadiazole, and a poly(tetrazapyrene).

4. The method according to claim 2 wherein said polymer is a PBI.

5. The method according to claim 1 wherein said non-solvent is selected from the group consisting of water, methanol, acetone, alcohols and water miscible non-solvents.

6. The method according to claim 1 wherein said coagulation bath further comprises a solvent.

7. The method according to claim 6 wherein said solvent is selected from the group consisting of DMAC, NMP, DMF, DMSO, sulfuric acid, methanesulfonic acid, trifluoroacetic acid and triflic acid.

8. The method according to claim 1 wherein said coagulation bath comprises a miscible mixture of a non-solvent and a solvent.

9. The method according to claim 8 wherein said mixture is selected from the groups consisting of DMAC and methanol, NMP and methanol, and DMAC and water.

10. The method according to claim 1 wherein said acid solution comprises between about 5 to about 100 weight percent of an acid and about 95% to 0% non-solvent.

11. The method according to claim 10 wherein said acid solution comprises about 50% acid and 50% non-solvent.

12. The method according to claim 10 wherein said acid is selected from the group consisting of phosphoric, sulfuric, and methanesulfonic acids.

13. A method for producing polymeric films suitable for use as an electrolyte comprising the steps of:
   a. adding a polymeric dope solution, said solution comprising a polymer dissolved in a solvent, in a liquid coagulation bath comprising a non-solvent and an acid, wherein the dope solution coagulates into a membrane which imbibes acid; and
   b. drying the membrane to remove residual non-solvent, which collapses the porous structure entrapping the acid and producing a dense film.

14. The method according to claim 13 wherein said polymer dope solution comprises a solution containing about 2 to about 30% of a selected polymer dissolved in about 98 to about 70% of a suitable solvent.

15. The method according to claim 14 wherein said selected polymer is selected from the group consisting of a polybenzimidazole (PBI), a poly(pyridine), a poly(pyrimidine), a polyimidazole, a polybenzthiazole, a polybenzoxazole, a polyoxadiazole, a polyquinoxaline, a polythiadiazole, and a poly (tetrazapyrene).

16. The method according to claim 14 wherein said polymer is a PBI.

17. The method according to claim 13 wherein said non-solvent is selected from the group consisting of water, methanol, acetone, alcohols and water miscible non-solvents.

18. The method according to claim 13 wherein said coagulation bath further comprises a solvent.

19. The method according to claim 18 wherein said solvent is selected from the group consisting of DMAC, NMP, DMF, DMSO, sulfuric acid, methanesulfonic acid, trifluoroacetic acid and triflic acid.

20. The method according to claim 13 wherein said acid is selected from the group consisting of phosphoric acid, sulfuric acid, and methanesulfonic acid.

21. The method according to claim 13 wherein the liquid coagulation bath contains between about 5% to 75% by weight acid and between about 95% to about 25% non-solvent.

22. The method according to claim 18 wherein the liquid coagulation bath contains between about 5% to 75% by weight acid, between about 95% to about 10% non-solvent, and between 0 to 85% solvent.

* * * * *